M. E. COULTER.
NUT LOCK.
APPLICATION FILED NOV. 23, 1914.
1,184,930. Patented May 30, 1916.
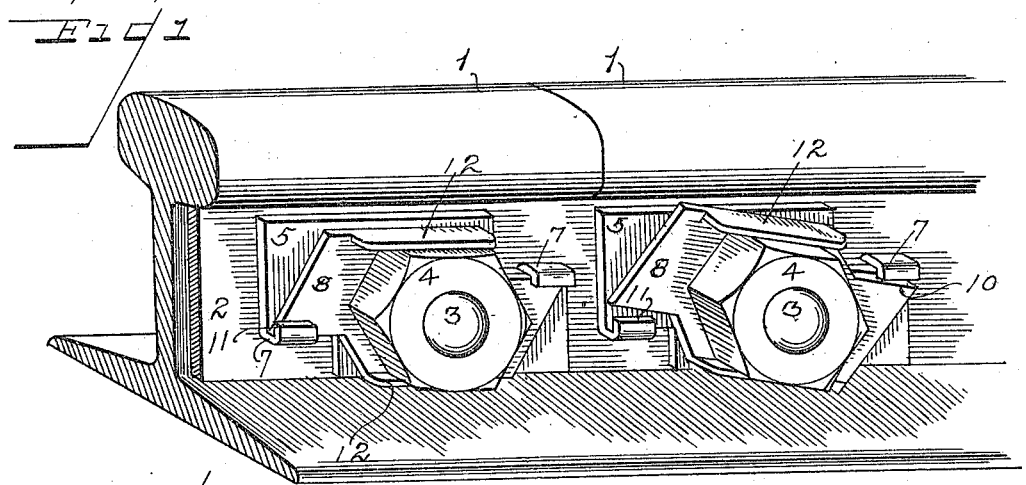
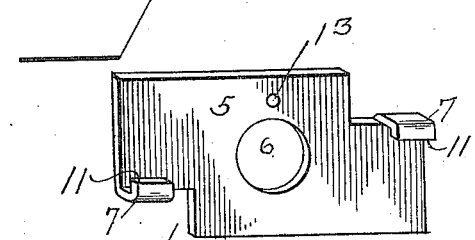
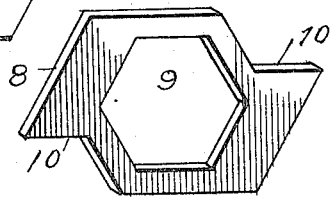
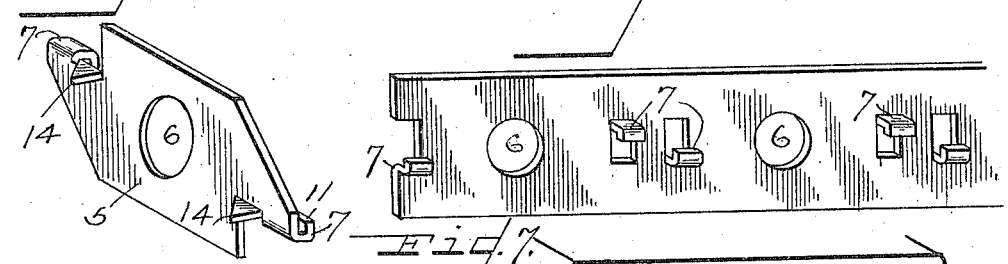
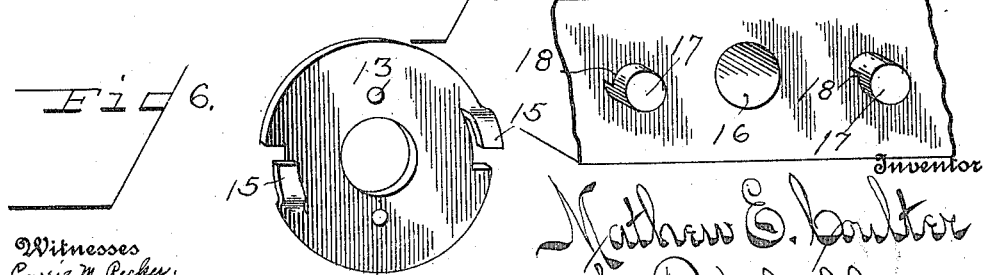

UNITED STATES PATENT OFFICE.

MATHEW E. COULTER, OF XENIA, OHIO.

NUT-LOCK.

1,184,930.  Specification of Letters Patent.  Patented May 30, 1916.

Application filed November 23, 1914. Serial No. 873,591.

*To all whom it may concern:*

Be it known that I, MATHEW E. COULTER, a citizen of the United States, residing at Xenia, in the county of Greene and State of Ohio, have invented certain new and useful Improvements in Nut-Locks, of which the following is a specification.

My invention relates to nut locks and particularly to a lock for securing the nut in its adjusted position which may be readily disengaged to permit the removal of the nut.

The object of the invention is to simplify the structure as well as the means and mode of operation of such devices whereby they will not only be cheapened in construction, but will be more efficient in use, easily and quickly applied, positive in operation, readily removable, and unlikely to get out of repair.

The device forming the subject matter hereof is applicable to any standard bolt or nut and does not require special modification such as grooves or recesses in the bolt or notches, teeth or openings in the nut.

With the above primary and other incidental objects in view, as will more fully appear in the specification, the invention consists of the features of construction, the parts and combinations thereof, and the mode of operation, or their equivalents, as hereinafter described and set forth in the claims.

Referring to the drawings, Figure 1 is a perspective view of a rail joint to the fastening bolts of which the nut lock, forming the subject matter hereof, has been applied. Fig. 2 is a detail perspective view of the washer plate. Fig. 3 is a detail perspective view of the locking member. Fig. 4 is a detail perspective view of the washer plate adapted for use upon wood structures. Fig. 5 is a detail perspective view of an elongated washer plate applicable to a series of spaced bolts. Fig. 6 is a detail perspective view of a further modification of the washer plate. Fig. 7 is a detail perspective view illustrating the application of the invention to machine construction.

Like parts are indicated by similar characters of reference throughout the several views.

In the drawings, 1—1 are the adjacent ends of two railway rails which are connected one with the other by the usual fish plates 2—2. The fish plates are secured in position by ordinary bolts 3—3. The lock forming the subject matter hereof is employed to secure the nuts 4 of the bolts 3 in their adjusted positions and comprises two separable parts, a washer plate and a locking plate to be engaged therewith. The washer plate 5 is passed over the protruding end of the bolt 3 in advance of the nut 4 and takes the place of the usual washer.

As shown in Fig. 2, the washer plate is provided with a central opening 6 for the reception of the bolt or stud 3 and, at opposite sides of said opening, the washer plate is provided with oppositely disposed lugs or ears 7. These lugs or ears may be formed separate from the plate and attached thereto but are preferably formed by cutting the plate to provide tongues which are bent laterally out of the plane of the plate to provide lugs or stops 7.

The locking member 8 comprises a plate having therein an opening 9 corresponding with the outline or contour of the nut to be locked. In the drawing only hexagonal nuts have been shown. It is to be understood that in the event the locking device is to be applied to rectangular nuts the opening 9 will be of a corresponding shape and size. The locking member 8 is provided with oppositely disposed wings or shoulders 10 adapted to engage the stops or lugs 7 of the washer plate when the parts are in adjusted position.

In its application to a rail joint as shown in Fig. 1, the washer plate is held against rotary movement by its engagement with the flange of the rail. The bolt 3, having been passed through the fish plates and interposed rail, the washer plate 5 is placed thereon in lieu of the usual round washer. The nut 4 is then tight upon the bolt or stud and when the nut 4 has been drawn as tight as is possible or as tight as desired the locking member 8 is placed over the nut, as shown at the right in Fig. 1. The nut 4 is then turned slightly backward or "eased off" until its movement is arrested by the engagement of the shoulders or wings 10 of the locking member with the stops or lugs 7 of the washer plate. The stops or lugs 7 are flanged as at 11 to prevent the lateral disengagement of the locking member 8.

In the event that it is desired to remove the nut 4, it is first slightly tightened to rotate the locking member 8 out of engagement with the lugs or stops 7 after which the locking member 8 may be removed laterally from the nut and the nut removed in the usual manner.

To provide an engaging face of greater extent than the thickness of the locking member 8, the member may be flanged as at 12 in Fig. 1. This flanged construction not only affords a greater area of engagement with the nut but also economizes space and permits the device to be used in recesses of limited extent such as between the head and base flanges of a railway rail.

When the device is used upon a plain surface or in a position where no flanges or other projections are afforded to limit the revoluble movement of the washer plate, the plate may be secured by means of a pin, a stud, or a screw introduced through an opening 13 in said plate. The opening 13 is so located in the plate as to be entirely covered by the nut 4. Such stud or pin will securely hold the washer against rotary movement without in any way interfering with the rotary movement of the nut.

In Fig. 4 there is shown a modified form of washer plate particularly adapted for use upon timber structures. In this form of device detents or pointed tongues 14 are provided upon the rear side of the washer plate which are pressed into the wood by the tightening action of the nut 4. By their engagement with the wood structure these detents 14 prevent the rotary movement of the washer plate.

In Fig. 5 there is shown a modification of the washer plate which comprises an elongated plate having a plurality of stud openings 6 each being provided with an adjacent set of stops or lugs 7. The device shown in Fig. 5 is for all practical purposes a fish plate having provided thereon the stops or lugs before described. If so desired, the device shown in Fig. 5 may be substituted for the usual fish plate 2 in which case the separate washer plate for each bolt is dispensed with.

Fig. 6 discloses an ordinary round washer having its edge cut at diametrically opposite points to form tongues 15 which are bent upward beyond the plane of the washer to form stops or lugs corresponding with the stops or lugs 7.

In applying the invention to machine constructions there may be provided upon opposite sides of the bolt holes 16 (Fig. 7) studs 17 which may be either integral with the machine part or may be the protruding ends of pins inserted therein. The studs 17 are notched or cut away as at 18 on their opposite sides. These studs 17 take the place of the lugs or stops 7. After the nut is properly tightened the locking member 8 is applied and the nut slightly reversed or "eased off" thereby causing the shoulders or wings 10 of the locking member to engage in the notches or recesses 18 of the studs 17. The backing or "easing off" movement necessary to lock the nut by the interengagement of the locking member 8 with the stops or lugs is so slight as to not materially affect the tightness of the bolt. In actual practice it has been found that a peripheral movement of one-sixteenth of an inch of the nut of a one inch bolt or the equivalent of substantially one-hundredth of a revolution is sufficient to lock the device. When a nut has been drawn tight, a variation of one-hundredth of a revolution in either direction will have no perceptible effect.

The vibrations to which the bolt is subjected tend to cause the nut to work loose. This loosening movement is resisted by the engagement of the wings or shoulders 10 with the lugs 7. It is to be noted that this locking differs from those heretofore commonly in use in that the locking action is affected by a slight reverse or loosening movement of the nut itself. The devices heretofore in use have been constructed to resist the initial reverse or loosening movement, which, in the present instance, is employed to affect the interengagement of the parts.

From the above description it will be apparent that there is thus provided a device of the character described possessing the particular features of advantage before enumerated as desirable but which obviously is susceptible of modification in its form, proportion, detail construction or arrangement of parts without departing from the principle involved or sacrificing any of its advantages.

While in order to comply with the statute the invention has been described in language more or less specific as to certain structural features, it is to be understood that the invention is not limited to any specific details, but that the means and construction herein described comprise but one mode of putting the invention into effect, and the invention is therefore claimed broadly in any of its possible forms or modifications within the scope of the appended claims.

Having thus described my invention, I claim:

1. A nut lock comprising a locking plate provided with an aperture corresponding to the contour of the nut, a flange on the plate engaging the flat side of the nut and stops engaged by the plate to prevent the rotation of the plate and the engaged nut.

2. A nut lock comprising a washer plate having stops arranged on opposite edges thereof, a locking plate arranged on the nut and provided with a plurality of nut engaging faces, one or more of said faces having greater engaging surface than the others and shoulders on the opposite sides of the locking plate arranged to engage the stops on the washer plate to prevent the rotation of the locking plate and the engaged nut.

In testimony whereof I hereunto set my hand this 10th day of November, 1914.

MATHEW E. COULTER.

Witnesses:
W. F. TRADER,
E. D. SMITH.

Copies of this patent may be obtained for five cents each, by addressing the "Commissioner of Patents, Washington, D. C."